United States Patent
Donham et al.

(10) Patent No.: US 7,705,846 B1
(45) Date of Patent: Apr. 27, 2010

(54) PROCESSING HIGH NUMBERS OF INDEPENDENT TEXTURES IN A 3-D GRAPHICS PIPELINE

(75) Inventors: Christopher D. S. Donham, San Mateo, CA (US); Alexander L. Minkin, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 54 days.

(21) Appl. No.: 11/955,377

(22) Filed: Dec. 12, 2007

Related U.S. Application Data

(62) Division of application No. 11/736,574, filed on Apr. 17, 2007, now Pat. No. 7,589,741, which is a division of application No. 10/696,848, filed on Oct. 30, 2003, now Pat. No. 7,245,302.

(51) Int. Cl.
*G06T 15/50* (2006.01)
*G06T 11/40* (2006.01)
*G06T 1/00* (2006.01)
*G09G 5/00* (2006.01)

(52) U.S. Cl. .................. 345/426; 345/522; 345/552; 345/582

(58) Field of Classification Search ............ 345/426, 345/522, 587, 552, 572, 582
See application file for complete search history.

(56) References Cited

U.S. PATENT DOCUMENTS 6,288,730 B1 * 9/2001 Duluk et al. ............. 345/552

* cited by examiner

*Primary Examiner*—Hau H Nguyen
(74) *Attorney, Agent, or Firm*—Patterson & Sheridan, LLP

(57) ABSTRACT

Circuits, methods, and apparatus provide for the storage of texture descriptors in a graphics memory. Since the texture descriptors are stored in a graphics memory, they do not need to be stored in the graphics processor itself, thus reducing graphics processor circuitry and cost. This allows more textures to be associated with each graphics primitive, thereby improving image realism.

18 Claims, 11 Drawing Sheets

600

| | INSTRUCTION NUMBER | INSTRUCTION | |
|---|---|---|---|
| 610 | 1 | TEX R0, #102 | 620 |
| | 2 | TEX R1, #103 | 630 |
| | 3 | ADD R2, R0, R1 | 640 |
| | 4 | TEX R0, #104 | |
| | 5 | TEX R1, #105 | |
| | 6 | ADD R2, R2, R0 | |
| | 7 | ADD R2, R2, R1 | |
| | 8 | TEX R0, #106 | |
| | 9 | TEX R1, #107 | |
| | 10 | ADD R2, R2, R0 | |
| | 11 | ADD R2, R2, R1 | |
| | 12 | TEX R0, #108 | |
| | 13 | TEX R1, #109 | |
| | 14 | ADD R2, R2, R0 | |
| | 15 | ADD R2, R2, R1 | |
| | 16 | OUT R2 | 650 |

FIG. 6

| ACTIVITY ~910 | INSTRUCTION FETCH ~920 | INSTRUCTION USED ~930 | TEXTURE HINT AND TEXTURE DESCRIPTION FETCH ~940 | TEXEL FETCH USING TEXTURE DESCRIPTOR ~950 | TEXEL USED ~960 |
|---|---|---|---|---|---|
| PREFETCH | 1-2<br>3-5 | None | 104,105 | 102,103 | None ~965 |
| PASS 1 | 6,7<br>8-11 | 1-3 | 106,107 | 104,105 | 102,103 ~970 |
| PASS 2 | 12-16 | 4-7 | 108,109 | 106,107 | 104,105 ~975 |
| PASS 3 | None | 8-11 | NoOp | 108,109 | 106,107 ~980 |
| PASS 4 | None | 12-16 | NoOp | NoOp | 108,109 ~985 |

| | | REG 3 | REG 4 | REG 5 | REG 6 |
|---|---|---|---|---|---|
| INITIAL 1 | INITIAL 2 | NEXT 1 | NEXT 2 | PRESENT 1 | PRESENT 2 |
| 102 | 103 | 104 | 105 | X | X |
| ↓ | ↓ | PRESENT 1 | PRESENT 2 | NEXT 1 | NEXT 2 |
| | | 104 | 105 | 106 | 107 |
| | | NEXT 1 | NEXT 2 | PRESENT 1 | PRESENT 2 |
| | | 108 | 109 | 106 | 107 |
| | | PRESENT 1 | PRESENT 2 | NEXT 1 | NEXT 2 |
| | | 108 | 109 | X | X |
| | | NEXT 1 | NEXT 2 | PRESENT 1 | PRESENT 2 |
| | | 104 | 105 | X | X |

FIG. 10

PROCESSING HIGH NUMBERS OF INDEPENDENT TEXTURES IN A 3-D GRAPHICS PIPELINE

CROSS-REFERENCE TO RELATED APPLICATIONS

This application is a divisional of U.S. patent application Ser. No. 11/736,574, filed Apr. 17, 2007, which is a divisional of U.S. patent application Ser. No. 10/696,848, filed Oct. 30, 2003, now U.S. Pat. No. 7,245,302, both of which are hereby incorporated by reference.

BACKGROUND

Computer graphics images are formed by combining a collection of primitives, otherwise known as geometries, such as rectangles, triangles, and lines that have visibility, color, and texture information associated with them. In computer systems, a graphics processor operates on these primitives and associated textures to determine the color intensity of individual pixels on the monitor. One particular circuit in the graphics processor, a shader, combines primitives and their associated textures to generate fragments, which are later converted to the individual pixels.

In conventional systems, these textures are identified by texture descriptors that are provided to a graphics processor via an accelerated graphics port (AGP) bus. These texture descriptors are stored on the graphics processor, used, and replaced by new texture descriptors as needed. As one example, 16 texture descriptors are cached on a specific graphics processor at a time. Each texture descriptor typically includes texture state information such as, but not limited to, the texture's base address (or base addresses, since each MIP layer may need its own), width, height, stride, texel format, wrap properties, border properties, and texture filter type. The textures themselves are stored in a frame buffer or graphics memory connected to the graphics processor, and a subset of these may be cached in the graphics processor for fast access.

There is a great demand on graphics processors to deliver ever more realistic images. One way of achieving greater realism is to use a larger number of textures in generating an image. For example, current graphics images are now requiring over 500 textures for each image frame. Each texture descriptor is large, (for example, there may be several hundred bits of information per texture descriptor) and having them available on the graphics processor requires an increase in processor memory, thus raising the cost of manufacturing the graphics processor.

Thus, what is needed are circuits, methods, and apparatus for making greater numbers of textures available to a graphics processor such that more realistic images may be generated, without the need to store all the texture descriptors on the graphics processor.

SUMMARY

Accordingly, embodiments of the present invention provide circuits, methods, and apparatus for increasing the number of textures available to a graphic processor by storing texture descriptors in a graphics memory. Since these texture descriptors are stored in the graphics memory instead of on the graphics processor, there can be many more textures associated with an image, thus increasing image realism. Further, if only a subset of these texture descriptors are cached on the graphics processor itself, die area is saved when the graphics processor is on an integrated circuit. There is also a reduction in AGP traffic since the descriptors are stored once for several uses.

An exemplary embodiment of the present invention provides a method of generating a graphics image. This method includes storing a plurality of texture descriptors in a graphics memory, and retrieving the plurality of texture descriptors from the graphics memory for use in a graphics processor.

Another exemplary embodiment of the present invention provides a method of generating a graphics image. This method includes storing a plurality of texture descriptors in a graphics memory, and retrieving the plurality of texture descriptors from the graphics memory for use in a graphics processor. The plurality of texture descriptors are stored once in the graphics memory and retrieved a plurality of times for use by the graphics processor, and a shader program causes the retrieval of the plurality of texture descriptors.

A further exemplary embodiment of the present invention provides a method of generating a graphics image. This method provides receiving a first texture descriptor, a first hint, and a first command from a graphics pipeline, the first command using the first texture descriptor, and retrieving a second texture descriptor identified by the first hint. A first portion of a shader program is also retrieved. This shader program portion includes a second command using the second texture descriptor, and a third command using a third texture descriptor. The third texture descriptor is also retrieved.

Yet a further exemplary embodiment of the present invention provides a method of generating a graphics image. This method includes retrieving a portion of a shader program comprising an instruction using a texture descriptor, and prefetching the texture descriptor from a graphics memory before the instruction is executed.

Another exemplary embodiment of the present invention provides an integrated circuit. This integrated circuit includes a shader circuit, a texture circuit coupled to the shader circuit, and a frame buffer interface coupled to the texture circuit. The texture circuit retrieves texture descriptors from a memory using the frame buffer interface.

A further exemplary embodiment of the present invention provides a graphics processor. The graphics processor includes a shader circuit, a texture circuit including a texture cache coupled to the shader circuit, and a frame buffer interface coupled to the texture circuit. The texture circuit retrieves a plurality of texture descriptors from an external memory coupled to the frame buffer interface and stores them in a texture cache.

A better understanding of the nature and advantages of the present invention may be gained with reference to the following detailed description and the accompanying drawings.

BRIEF DESCRIPTION OF THE DRAWINGS

FIG. 6 is an example of a shader program;

FIG. 9 is a table showing activities performed during the running of the shader program shown in FIG. 6;

FIG. 10 illustrates a set of registers used by an embodiment of the present invention and their contents during the execution of the shader program of FIG. 6.

DESCRIPTION OF EXEMPLARY EMBODIMENTS

Figure 1:
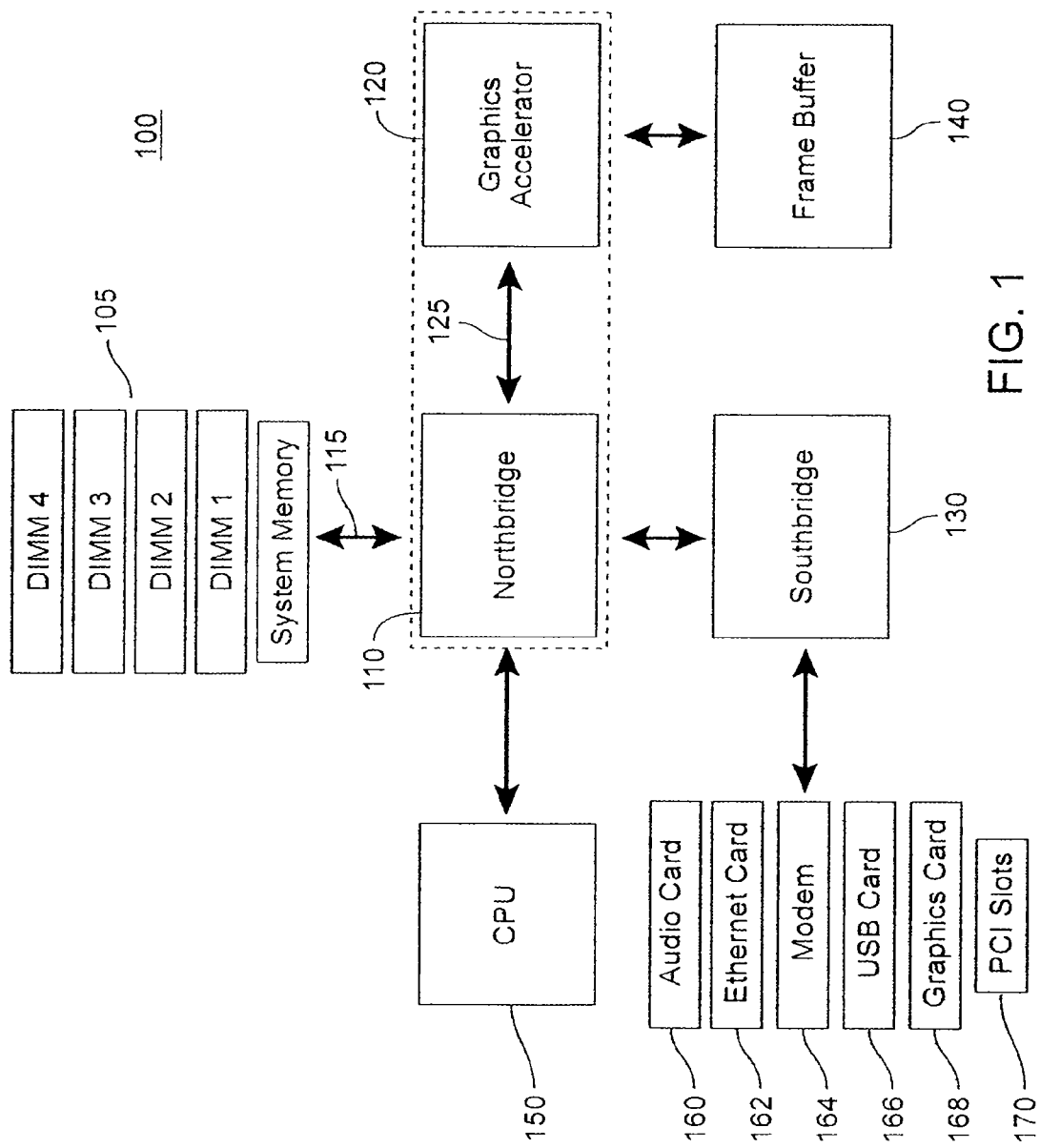
FIG. 1 is a block diagram of a computing system that benefits by incorporation of embodiments of the present invention.

FIG. 1 is a block diagram of a computing system 100 that benefits by incorporation of embodiments of the present invention. Included are a Northbridge 110, graphics accelerator 120, Southbridge 130, frame buffer 140, central processing unit (CPU) 150, audio card 160, Ethernet card 162, modem 164, USB card 166, graphics card 168, PCI slots 170, and memories 105. This figure, as with all the included figures, is shown for illustrative purposes only, and does not limit either the possible embodiments of the present invention or the claims.

The Northbridge 110 passes information from the CPU 150 to and from the memory 105, graphics accelerator 120, and Southbridge 130. Southbridge 130 interfaces to external communication systems through connections such as the universal serial bus (USB) card 166 and Ethernet card 162. The graphics accelerator 120 receives graphics information over the accelerated graphics port (AGP) bus 125 through the Northbridge 110 from CPU 150 and directly from memory or frame buffer 140. The graphics accelerator 120 interfaces with the frame buffer 140. Frame buffer 140 may include a display buffer which stores the pixels to be displayed.

In this architecture, CPU 150 performs the bulk of the processing tasks required by this computing system. In particular, the graphics accelerator 120 relies on the CPU to set up calculations and compute geometry values. Also, the audio or sound card 160 relies on the CPU to process audio data, positional computations, and various effects, such as chorus, reverb, obstruction, occlusion, and the like, all simultaneously. Moreover, the CPU remains responsible for other instructions related to applications that may be running, as well as for the control of the various peripheral devices connected to the Southbridge.

Figure 2:
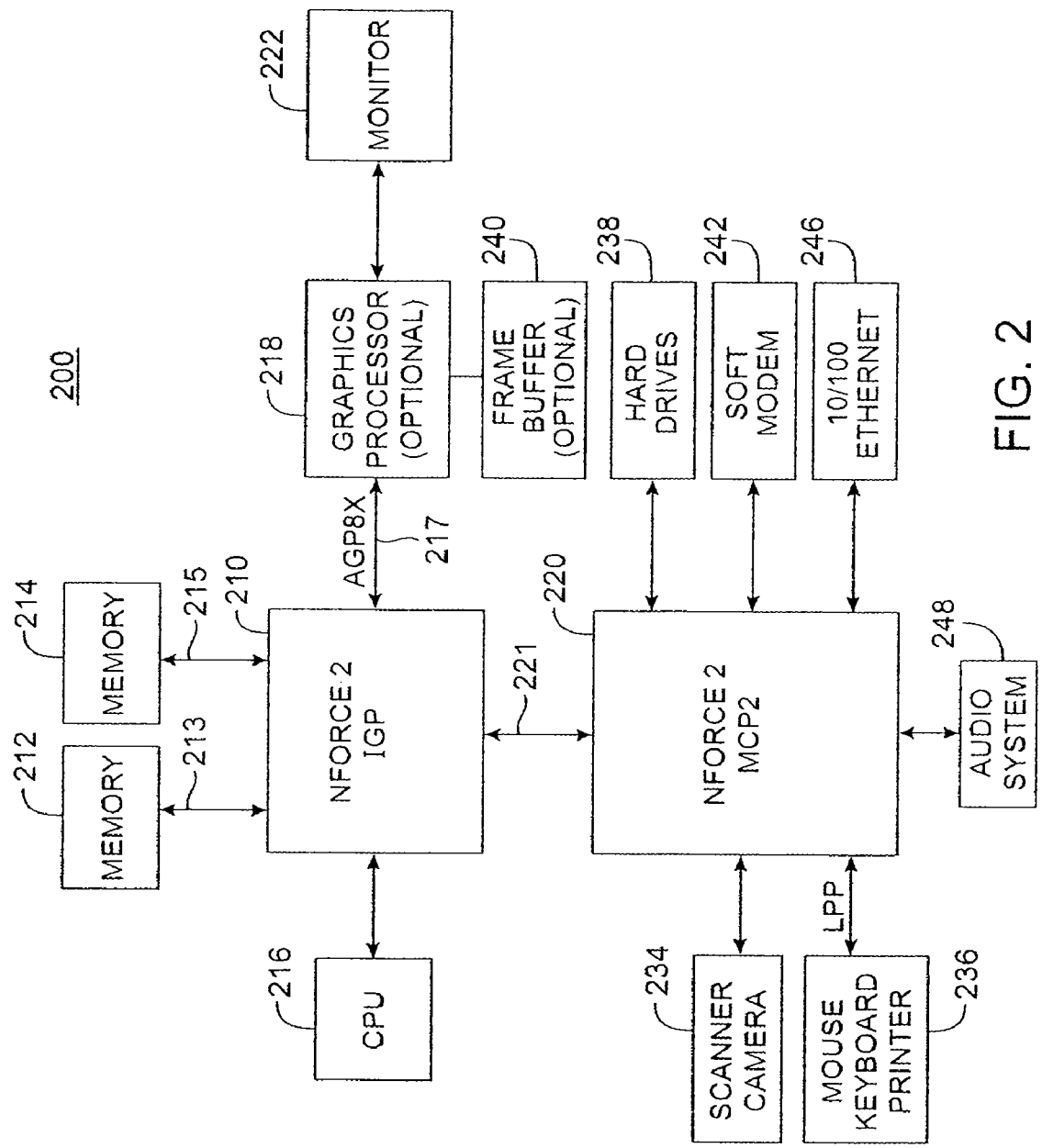
FIG. 2 is a block diagram of an improved computer system that benefits by incorporation of embodiments of the present invention.

FIG. 2 is a block diagram of an improved computer system that benefits by incorporation of embodiments of the present invention. Included are an nForce2 integrated graphics processor (IGP) 210, an nForce2™ media communications processor (MCP2) 220, memory 212 and 214, CPU 216, optional graphics processor 218 and frame buffer 240, monitor 222, scanner or camera 234, mouse, keyboard, and printer 236, hard drives 238, soft modem 242, Ethernet connection 246, and audio system 248.

This revolutionary system architecture has been designed around a distributed processing platform, which frees up the CPU to perform tasks best suited to it. Specifically, the nForce2 IGP 210 includes a graphics processing unit (GPU) which is able to perform graphics computations previously left to the CPU. Alternately, the nForce2 IGP 210 may interface to an external GPU which performs these computations. Also, nForce2 MCP2 220 includes an audio processing unit (APU), which is capable of performing many of the audio computations previously done by the CPU. In this way, the CPU is free to perform its tasks more efficiently. Also, by incorporating a suite of networking and communications technologies such as USB and Ethernet 246, the nForce2 MCP2 220 is able to perform much of the communication tasks that were previously the responsibility of the CPU 216.

In this architecture, the nForce2 IGP 210 communicates with memories 212 and 214 of over buses 213 and 215. The nForce2 IGP 210 also interfaces to an optional graphics processor 218 over an advanced AGP bus 217. In various computer systems, this external processor may be removed, and the monitor 222 may be driven by the nForce2 IGP directly. In other systems, there may be more than one monitor, some or all of which are coupled to optional graphics processors or the nForce2 IGP directly. The nForce2 IGP 210 communicates with the nForce2 MCP2 220 over a Hypertransport link 221. The optional graphics processor 218, may also interface with external memory, which is not shown in this example. Embodiments of the present invention may be used to improve the memory interfaces to memories 212 and 214, from the graphics processor 218 to its external memory, or to other optional memories not shown here, or other memory interfaces in other digital systems.

The nForce2 MCP2 220 contains controllers for Ethernet connections 246 and soft modem 242. Also included are an interface for a mouse, keyboard, and printer 236, and USB ports for cameras, scanners, and hard drives 234 and 238.

This arrangement allows the CPU, the nForce2 IGP, and the nForce2 MCP2, to perform processing independently, concurrently, and in a parallel fashion.

Figure 3:
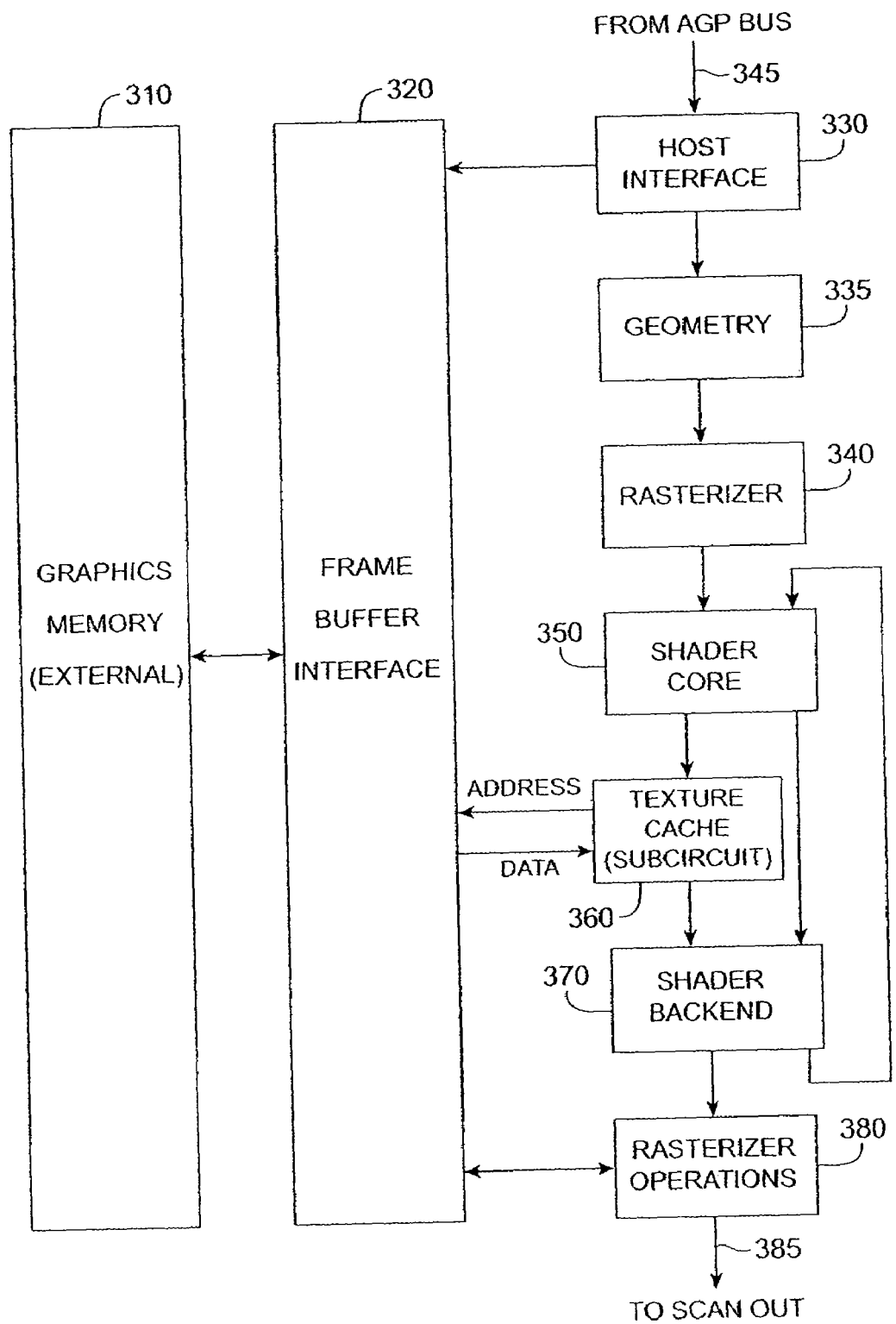
FIG. 3 is a block diagram of a graphics system that is benefited by incorporation of embodiments of the present invention.

FIG. 3 is a block diagram of a graphics system that is benefited by incorporation of embodiments of the present invention. Included are a graphics memory 310, frame buffer interface 320, host interface 330, geometry engine 335, rasterizer 340, shader core 350, texture cache and subsystem 360, shader backend 370, and rasterizer operations circuit (ROP) 380. In a typical embodiment, all these circuits, except the graphics memory 310 are on an integrate circuit chip, for example, an IGP or graphics processor integrated circuit.

Graphics primitives, textures, and texture descriptors are received from the AGP bus on line 345 by the host interface 330. The host interface 330 stores the textures in the graphics memory 310 via the frame buffer interface 320. Conventionally, the texture descriptors are received over the AGP bus and passed down the pipeline as they are needed. Embodiments of the present invention provide a greater number of available textures by having the host interface 330 store the texture descriptors in the graphics memory 310 along with the textures themselves. By storing these descriptors in the external graphics memory, many more textures are available to use in generating an image than if the texture descriptors had to be stored on the graphics processor integrated circuit itself.

The primitives are processed by the geometry engine 335 and rasterizer 340 and passed to the shader core 350. The shader core 350 provides data to the texture cache subsystem 360 and shader backend 370. The shader core and shader backend textures the primitives, for example, according to a shader program that is preloaded by a driver. More details on shaders and their programs are available in U.S. patent application Ser. No. 09/885,242, titled PROGRAMMABLE PIXEL SHADING ARCHITECTURE, filed Jun. 19, 2001, and U.S. application Ser. No. 09/885,382, titled SYSTEM, METHOD AND COMPUTER PROGRAM PRODUCT FOR A PROGRAMMABLE PIXEL PROCESSING MODEL WITH INSTRUCTION SET, filed Jun. 19, 2001, both of which are incorporated by reference.

In a specific embodiment of the present invention, the texture cache subsystem inspects the next several lines of the shader program to determine which textures will be needed. The texture cache subsystem retrieves the corresponding texture descriptors from the graphics memory 310 using the frame buffer interface 320. The corresponding texture descriptors retrieved from the graphics memory 310 contain information such as location, stride, filtering, height, width, and other parameters necessary for the retrieval of the textures themselves from the graphics memory. The texture cache subsystem 360 is then able to retrieve the textures from the graphics memory 310 via the frame buffer interface 320. The textures may then be cached in the texture cache subsystem 360. Specific examples of how this may be done may be found in U.S. Pat. No. 6,629,188, titled Circuit & Method for Prefetching Data for a Texture Cache, by Minkin et al., and U.S. patent application Ser. No. 09/712,632, titled Circuit & Method for Addressing a Texture Cache, by Minkin, both of which are incorporated by reference.

The shader core 350 and shader backend 370 texture the primitives with the retrieved textures until completion, whereupon the shader backend 370 provides the result to the ROP 380. The output of the ROP on bus 385 is provided to a scan-out engine (not shown), which in turn provides pixels for display on a monitor.

When a texture descriptor that has already been stored in the graphics memory 310 is needed again, the texture descriptor is not sent over the AGP bus, rather a pointer, index, or other representation of the texture descriptor is sent. For example, a texture number referred to in a line of the shader program may identify a texture descriptor. These representations are much smaller than a texture descriptor. For example, a representation such as a pointer may be two bytes in length, where as a texture descriptor may be 300 bits in length.

Figure 4A:
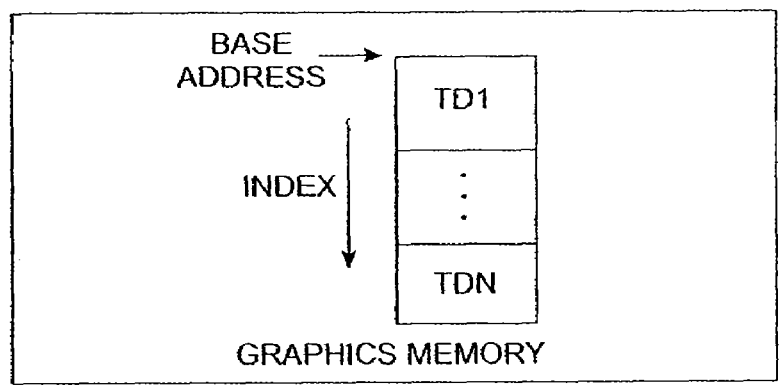
FIGS. 4A-4C illustrates several examples of how texture descriptors are identified in embodiments of the present invention.
Figure 4B:
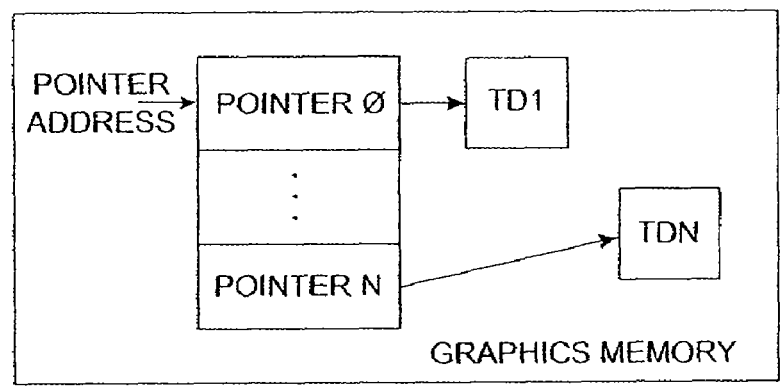
Figure 4C:
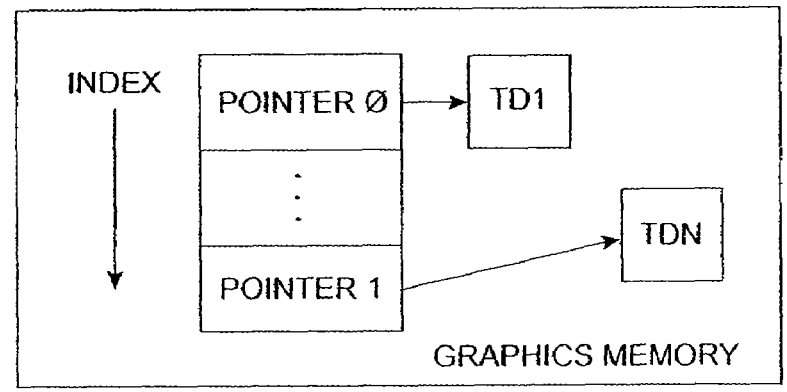

FIGS. 4A-4C illustrate several examples of how needed texture descriptors are identified by various embodiments of the present invention. In FIG. 4A, a base address and index of a required texture descriptor are passed down the pipeline as pipeline state. The base address and index (or offset) identify a specific texture descriptor in an array of texture descriptors located in the graphics memory 310. That is, the index is used to find a texture descriptor in an array of texture descriptors specified by the base address. The texture descriptor contains the location, height, width, stride, filtering, and other properties needed for retrieval of the texture itself.

FIG. 4B illustrates a method that provides an extra level of indirection. A pointer address is passed down the pipeline, and at each pointer address is stored a pointer that identifies the location of a texture descriptor. The pointer address is accessed and read to determine the texture descriptor location, and the needed texture descriptor is retrieved.

In FIG. 4C a pointer table is stored in the graphics memory. In a specific embodiment, the pointer table is an array of addresses, each address being the location of a texture descriptor. A base address of the pointer table can be passed down the pipeline, thus allowing the use of multiple pointer tables. Alternately, a single or global table can be used, thus eliminating the need for passing individual base address. The indices are passed down the pipeline, and each index is used to locate a pointer, which in turn identifies the location of a needed texture descriptor. In another embodiment of the present invention, pointers that directly identify texture descriptors can be passed down the pipeline as pipeline state.

Figure 5:
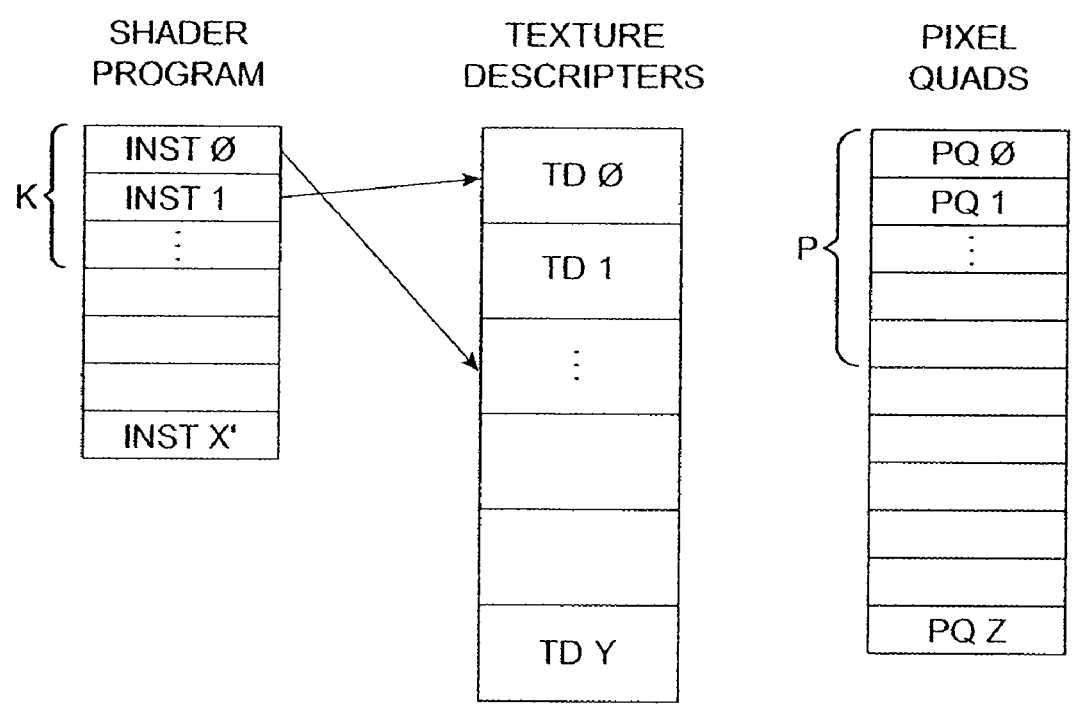
FIG. 5 shows a representation of a shader program, texture descriptors used by the shader program, and a number of pixel quads to be processed by the shader program.

The shader program may contain instructions or other information identifying required texture descriptors, or the required texture descriptors may be determined from the shader program itself. For example, a base address may be provided by the pipeline. When a texture having a texture number N is needed by the shader program, the texture descriptor having the address that is the base address plus N times M, where M is the number of bits between starting points of the texture descriptors, is retrieved. FIG. 5 shows a representation of a shader program, texture descriptors used by the shader program, and a number of pixel quads to be processed by the shader program. During each pass through the shader, some number of instructions are executed, for example K instructions may be executed, and each instruction may require one or more textures, identified by texture descriptors. During each pass some number of quads, for example P, are processed, then either input back into the shader core 350 for further processing, or output to the ROP 380.

The addressing schemes illustrated in FIGS. 4A-4C can be used by the shader program. In FIG. 4A, the base address and index are in the shader program. In FIG. 4B, the pointer address is in the program, and in FIG. 4C, the index for the needed location in the pointer table is provided by the program. In another embodiment, the address of the required texture descriptor is in the shader program.

In these ways, many textures can be associated with each primitive. For example, if a two-byte word is used as a pointer or index in the above configurations, over 64,000 textures may be associated with each primitive. This is an improvement over the prior art, where typically 2 to 16 texture descriptors are stored in the graphics processor.

When a pointer or other representation is received by the texture subsystem and cache 360, a texture descriptor is retrieved from the graphics memory 325, if it is not already in the texture cache. The latency for texture retrieval from the graphics memory can be on the order of 200 clock cycles. To prevent this latency from stalling pixel processing, in a specific embodiment of the present invention, texture descriptors are prefetched and stored in the texture circuit before they are needed by the shader. These prefetches are facilitated by hints or other indications of texture descriptors that will be required by the graphics pipeline. These hints identify textures that are to be fetched from the graphics memory and are used to retrieve texture descriptors in advance of the time that the texture descriptors are required.

FIG. 6 is a shader program 600 that is used for exemplary purposes in the following flow charts and tables. Included are a number of instructions identified numerically in column 610. In this simple example, textures are read from memory, accumulated or added together, then output. Specifically, instruction 1 620 reads texture 102 and stores it in register R0. Similarly, instruction 2 630 reads texture 103 into register R1. Instruction 3 640 directs that the contents of R0 and R1 are added together and stored in register R2. Further steps include reading other textures and accumulating the values in register R2. The final instruction 16 650, directs that register R2 be output. Again, this simplified shader program is useful in explaining exemplary embodiments of the present invention.

Figure 7:
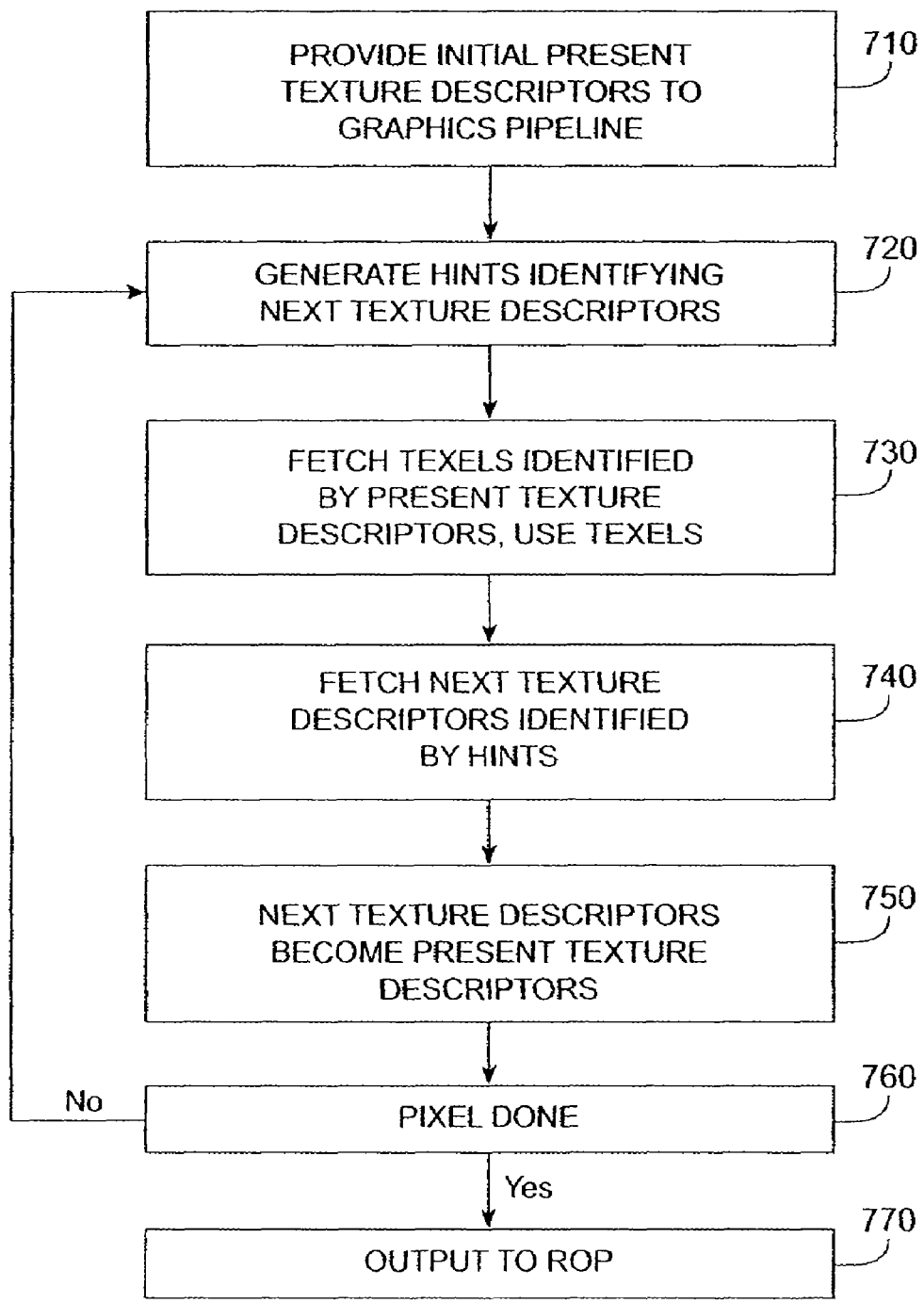
FIG. 7 is a flow chart showing a method of retrieving texture descriptors from a graphics memory in accordance with an embodiment of the present invention.

FIG. 7 is a flow chart 700 showing a method of retrieving textures from a graphics memory in accordance with an embodiment of the present invention. In summary, texture descriptors and hints are provided. The hints can be generated by the pipeline or the shader program. In a specific embodiment, two present texture descriptors and two hints are provided. The hints are used to fetch the next texture descriptors, while the present texture descriptors are used to fetch the next texture values. The next hints are determined by looking ahead in the shader program, either by examining a specific number of instructions, for example 10 instructions, or by looking at enough of the program to find the next two required textures. This continues until the processing of the pixels is complete, at which time the pixels are output to the ROP.

Specifically, in act 710, the first or initial present textures are provided to the graphics pipeline. Again, these may be provided over the AGP bus. In act 720, hints identifying the next required texture descriptors are generated. In act 730, the textures identified by the present texture descriptors are fetched and used. The texture descriptors identified by the hints are fetched in act 740. In act 750, the next texture descriptors become the present texture descriptors. In act 780, it is determined whether the processing of the pixels is complete. If it is, the pixels are output to the ROP in act 770. If the pixel processing is not complete, the process repeats, and hints identifying the next texture descriptors are generated. It will be appreciated by one skilled in the art that several of these acts may be done simultaneously, or in an alternate sequence.

Figure 8:
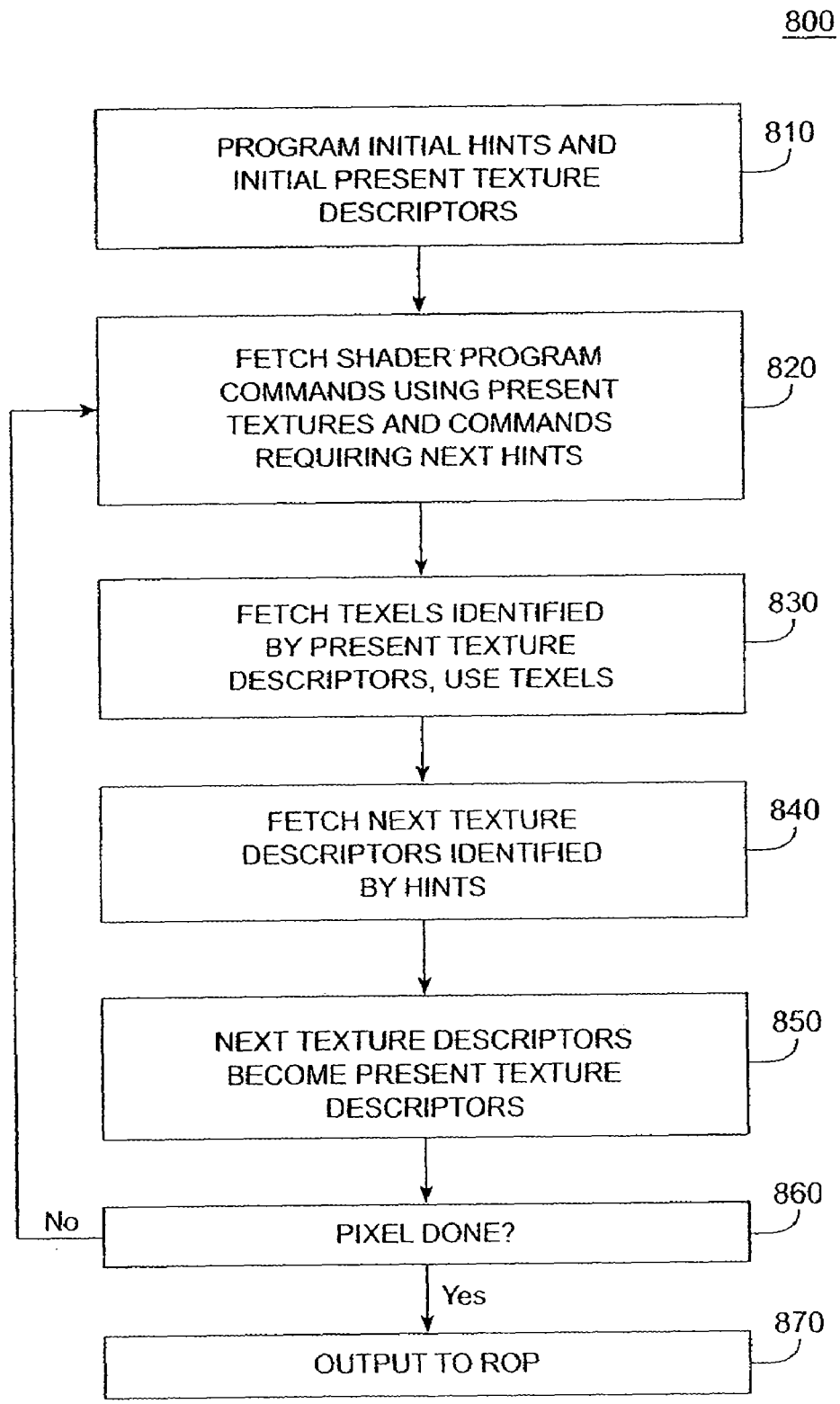
FIG. 8 is a flow chart showing a method of retrieving texture descriptors from a graphics memory in accordance with an embodiment of the present invention.

FIG. 8 is a flow chart 800 showing a method of retrieving texture descriptors from a graphics memory in accordance with an embodiment of the present invention. In FIG. 8, texture descriptors are identified by a shader program, rather than by identifiers received by the graphics pipeline.

Specifically, initial hints and initial present texture descriptors are loaded or programmed in act 810. In act 820, shader program instructions are fetched. Specifically, the shader program commands using the present textures and those commands requiring the next hints are fetched. In act 830, the textures identified by the present texture descriptors are fetched and used. The next texture descriptors identified by the hints are fetched in act 840. In act 850, the next texture descriptors become the present texture descriptors. In act 868, it is determined whether the pixel processing is complete. If it is, the pixels are output to the ROP in act 870. If not, more of the shader program is fetched in act 820. It will be appreciated by one skilled in the art that several of the acts may be done simultaneously, or in an alternate sequence.

FIG. 9 is a table 900 showing the activities performed during the running of the shader program shown in FIG. 6. Column 910 indicates the activity that is taking place, column 920 indicates which instructions of the shader program are being fetched, column 930 shows the instructions being used, column 940 shows the texture that is being hinted and the corresponding texture description that is being fetched. Also, column 950 shows the textures being fetched using the present texture descriptors, while column 916 indicates the texture being used. In this specific example, two texture descriptors are shown as being used by the shader. In other embodiments, other numbers of texture descriptors and corresponding textures may be used.

In row 965, a prefetch occurs. Specifically, instructions 1 and 2 and of the shader program in FIG. 6 are fetched. Initial texture descriptors 102 and 103 have been previously provided, for example, over the AGP bus to the graphics pipeline, or by the shader program itself. The textures 102 and 103 are fetched at this time. Also, the shader program is examined to determine the next two textures that will be needed. In this case, as can be seen in FIG. 6, those textures are 104 and 105, used in instruction numbers 4 and 5.

In row 970, a first pass through the shader begins. The next instructions required are fetched. The instructions used are instructions 1-3, in which textures 102 and 103 are read, added, and stored in register R2. Again, the shader program is examined and the next texture descriptors that are required are determined. In this specific example, textures 106 and 107 are needed. Also, textures 104 and 105 are fetched, while textures 102 and 103 are used.

In row 975, a second pass through the shader program is performed. Again enough of the shader program is fetched to determined the next required texture descriptors. In this pass instructions 4-7 are executed, which read textures 104 and 105. These textures are added to the value already stored in R2. Again, the next two required texture descriptors are determined, in this case texture descriptors 108 and 109. Also, the textures 106 and 107 are fetched, and the textures 104 and 105 previously fetched are used specifically by instructions 4 and 5 in the shader program.

In row 980, a third pass through the shader is performed. Specifically, shader program instructions 8 through 11 are executed. Textures 108 and 109 are retrieved, while textures 106 and 107 are used, specifically by shader instructions 8 and 9.

In row 985, a fourth pass through the shader is executed. Specifically instructions 12 through 16 are executed. These instructions use the textures retrieved in row 985, specifically textures 108 and 109. The result is output to the ROP, as indicated by instructions 16 650 in the shader program of FIG. 6.

A specific embodiment uses three sets of registers to implement the above flow charts. In this embodiment, two registers for each set are used in order to provide two texture lookups per pass or loop through the shader. The first set stores the initial texture descriptors provided by the pipeline, for example, these can be input to the pipeline by a driver. Again, the pipeline also provides two hints, found by looking ahead in the shader program, the texture descriptors for which are retrieved and stored in the second set of registers. When the next texture descriptors needed are determined by inspection of the shader program, they are retrieved from the graphics memory and stored in the third set of registers. After that, the following textures are written to the second and third sets of registers in a ping-pong or alternating fashion. The first set of registers is reused when another set of pixels or quads begin running the same shader program, thereby receiving the same starting information used by the first set of pixels processed by the shader program.

FIG. 10 is a chart showing the 6 registers used by a specific embodiment of the present invention, and their contents during the various passes through the shader as shown in FIG. 9. The registers include a first and second initial register 1010 and 1012, and two other pairs of registers 1014 and 1016, as well as 1018 and 1020, which store present and next texture descriptors in the ping-pong fashion described above.

The first texture descriptors required are 102 and 103. These texture descriptors are initialized and stored in registers 1010 and 1012. These initial texture descriptors remain in these registers throughout the running of the shader program, such that the next quad of pixels to be processed have these texture descriptors available to them.

As was seen in FIG. 9, the next texture descriptors needed are 104 and 105. These are fetched based on hints provided to the pipeline or by the shader program, and stored in register 3 1014 and register 4 1016.

In row 1040, texture descriptors 104 and 105 become the present texture descriptors, while the hinted texture descriptors 106 and 107 are retrieved and stored in register 5 1018 and register 6 1020. In row 1050, texture descriptors 106 and 107 become the present texture descriptors, while the next texture descriptors 108 and 109 are retrieved and stored in register 3 1014 and register 4 1016. In row 1060, there is no next texture descriptors required, thus the contents of register 5 1018 and register 6 1020 are not updated. In row 1070, the process begins again on the next quad of pixels. Again, in this specific example, two texture descriptors and corresponding textures are processed by the shader at a time. In other embodiments of the present invention, a different number of texture descriptors and corresponding textures may be processed. For example, four, eight, sixteen, or more texture descriptors and corresponding textures may be processed by a shader program at a time.

Figure 11:
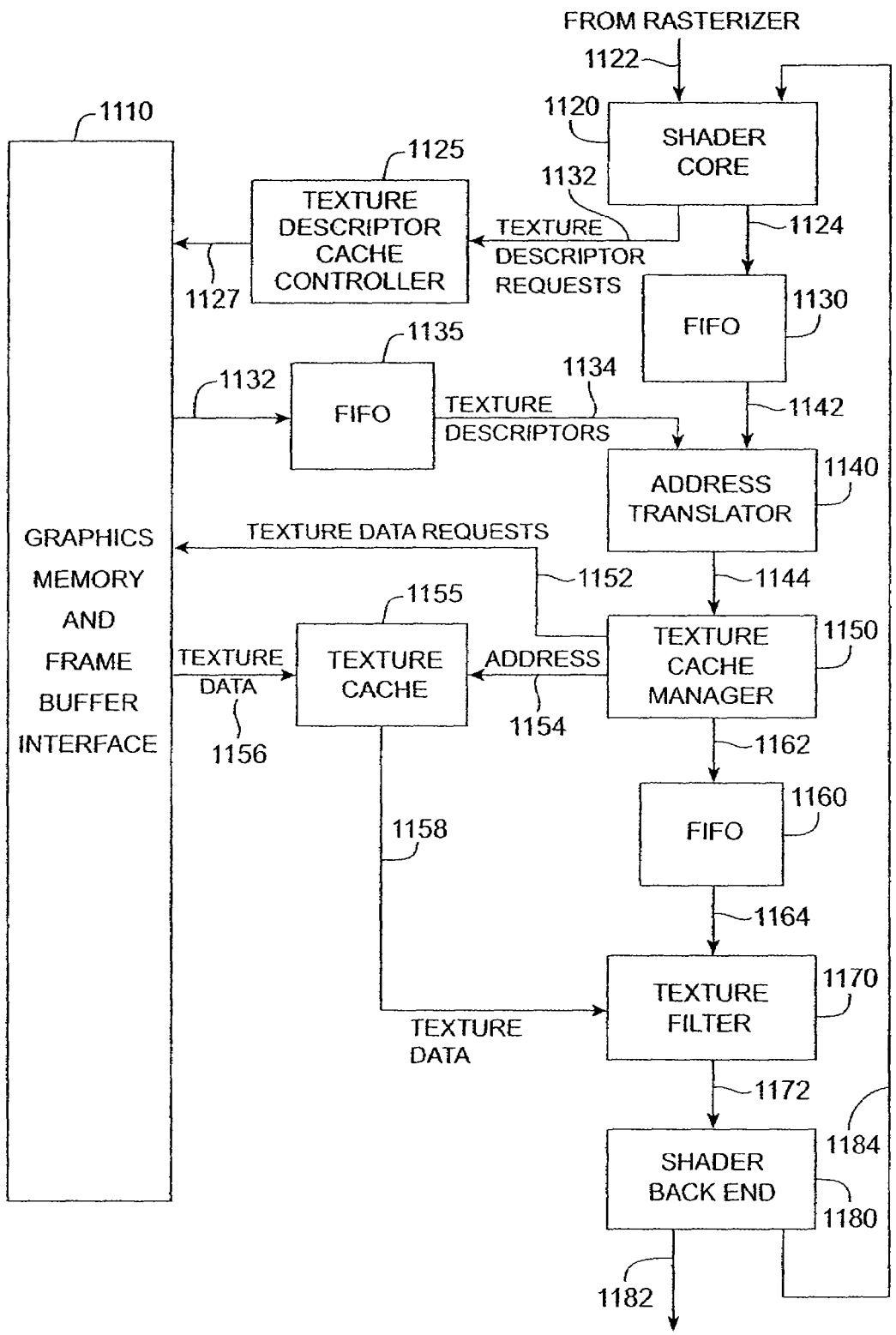
FIG. 11 illustrates an the embodiment of the present invention that caches texture descriptors in order to eliminate the need for hints.

FIG. 11 illustrates an the embodiment of the present invention that caches texture descriptors in order to eliminate the need for hints. Included are a graphics memory and frame buffer interface 1110, shader core 1120, texture descriptor cache and cache controller 1125, FIFOs 1130 and 1135, address translator 1140, texture cache manager 1150, texture cache 1155, FIFO 1160, texture filter 1170, and shader backend 1180.

Pixel quads are received on bus 1122 from the rasterizer by the shader core 1120. The shader core 1120 inspects at least part of a shader program to determine which textures will be needed. From this, requests for texture descriptors are generated and provided on bus 1132 to the texture descriptors cache controller 1125. The shader core 1120 also provides these requests on bus 1124 to the FIFO 1130. The texture descriptor cache controller 1125 determines whether the needed texture descriptor is currently stored in the texture descriptor cache or must be retrieved from the graphics memory 1110. If the texture descriptor is not in cache, it is requested from the graphics memory 1110 by the texture descriptor cache controller 1125.

The graphics memory 1110 provides, through its frame buffer interface, requested texture descriptors to FIFO 1135 on bus 1132. The retrieved texture descriptors are stored in FIFO 1135 and provided to the address translator 1140 on bus 1134. The address translator receives transfer descriptor requests on bus 1142 from the FIFO 1130 and transfer descriptors on bus 1134 from the FIFO 1135. In order to synchronize these requests and descriptors, an embodiment of the present invention sets a flag with each request indicating whether the transfer descriptor is retrieved from memory. If the flag is set, the transfer descriptor is pulled from FIFO 1135.

The address translator 1140 processes the texture descriptor requests on bus 1142 and texture descriptors on bus 1134 and generates memory addresses which are provide on bus 1144 to the texture cache manager 1150. The texture cache manager 1150 determines whether the texture needed is in texture cache 1155 or must be retrieved from memory. In the case of a texture cache miss, a texture data request is provided on bus 1152 to the graphics memory, through the frame buffer interface 1110, which provides texture image data on bus 1156 to texture cache 1155. In the case of a texture cache hit, the texture cache manager provides a texture cache address to the texture cache on bus 1154. The texture cache 1155 provides texture data on bus 1158 to the texture filter 1170. The texture filter 1170 filters the textures and provides an output on bus 1172 to the shader backend 1180. When an individual group of pixel quads is finished processing, they are provided on bus 1182 to the ROP, otherwise they are provided to back to the shader core on bus 1184.

A specific embodiment of the present invention uses one level of indirection in storing texture descriptors. That is, a lookup table is stored, either on the graphics processor or in the graphics memory. This lookup table translates texture ids or representations to texture descriptor locations in the graphics memory. In this way, texture descriptors can be stored at any location in the graphics memory. In a specific embodiment, this lookup table includes 512 entries. In other embodiments, there may be a different number of entries.

In this and other embodiments, there is one level of indirection in identifying textures actively used by the graphics pipeline. In one embodiment, there are 16 active textures stored in cache. A lookup table is available to engines in the graphics pipeline, where the lookup table translates texture numbers used by the pipeline, such as 0-15, to active textures stored in cache. In other embodiments there may be a different number of active textures.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A computer-implemented method for generating a graphics image, comprising:
   executing a current portion of a shader program to generate one or more pixels associated with the graphics image;
   inspecting a subsequent portion of the shader program to determine one or more texture descriptors that each identifies a different texture to be applied to the one or more pixels;
   retrieving the one or more texture descriptors from a graphics memory before the subsequent portion of the shader program is executed; and
   applying one or more textures to the one or more pixels based on the one or more texture descriptors.

2. The method of claim 1, wherein the subsequent portion of the shader program includes a base address and index for each of the one or more texture descriptors.

3. The method of claim 1, wherein the subsequent portion of the shader program includes an address of a pointer for each of the one or more texture descriptors.

4. The method of claim 1, wherein the subsequent portion of the shader program includes an index to a pointer table for each of the one or more texture descriptors.

5. The method of claim 1, wherein the subsequent portion of the shader program includes a pointer for each of the one or more texture descriptors.

6. The method of claim 1, wherein the step of inspecting a subsequent portion of the shader program to determine one or more texture descriptors further comprises identifying one or more hints that each identifies a different texture descriptor of the one or more texture descriptors.

7. The method of claim 6, wherein each of the one or more hints is generated by execution of the shader program.

8. The method of claim 1, wherein the step of inspecting a subsequent portion of the shader program to determine one or more texture descriptors further comprises reading a predetermined number of instructions associated with the subsequent portion of the shader program to determine the one or more texture descriptors.

9. The method of claim 1, wherein the step of inspecting a subsequent portion of the shader program to determine one or more texture descriptors further comprises reading instructions associated with the subsequent portion of the shader program until a predetermined number of texture descriptors are identified.

10. A graphics processor, comprising:
a graphics memory;
a shader core configured to execute a current portion of a shader program to generate one or more pixels associated with a graphics image;
a texture cache subsystem configured to:
    inspect a subsequent portion of the shader program to determine one or more texture descriptors that each identifies a different texture to be applied to the one or more pixels,
    retrieve the one or more texture descriptors from the graphics memory before the subsequent portion of the shader program is executed, and
    apply one or more textures to the one or more pixels based on the one or more texture descriptors.

11. The graphics processor of claim 10, wherein the subsequent portion of the shader program includes a base address and index for each of the one or more texture descriptors.

12. The graphics processor of claim 10, wherein the subsequent portion of the shader program includes an address of a pointer for each of the one or more texture descriptors.

13. The graphics processor of claim 10, wherein the subsequent portion of the shader program includes an index to a pointer table for each of the one or more texture descriptors.

14. The graphics processor of claim 10, wherein the subsequent portion of the shader program includes a pointer for each of the one or more texture descriptors.

15. The graphics processor of claim 10, wherein the texture cache subsystem is further configured to identify one or more hints within the subsequent portion of the shader program, wherein each hint identifies a different texture descriptor of the one or more texture descriptors.

16. The graphics processor of claim 15, wherein each of the one or more hints is generated by execution of the shader program.

17. The graphics processor of claim 10, wherein the texture cache subsystem is further configured to read a predetermined number of instructions associated with the subsequent portion of the shader program to identify the one or more texture descriptors.

18. The graphics processor of claim 10, wherein the texture cache subsystem is further configured to read instructions associated with the subsequent portion of the shader program until a predetermined number of texture descriptors are identified.

* * * * *